April 30, 1929. A. COLANDUONI 1,711,447
VEHICLE CONTROL FOR CRIPPLES
Filed Feb. 3, 1926
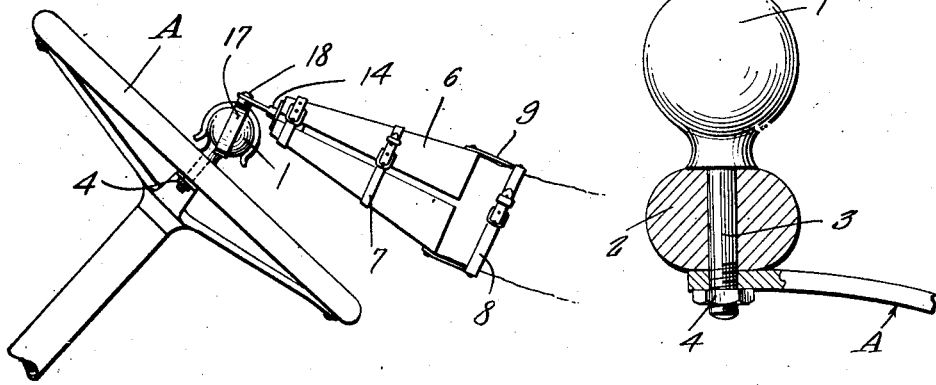
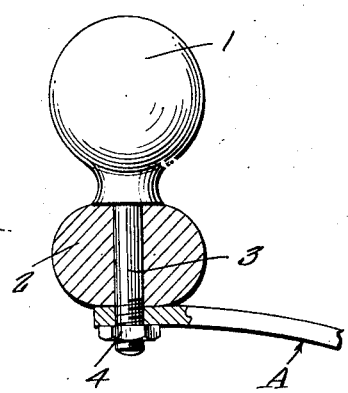
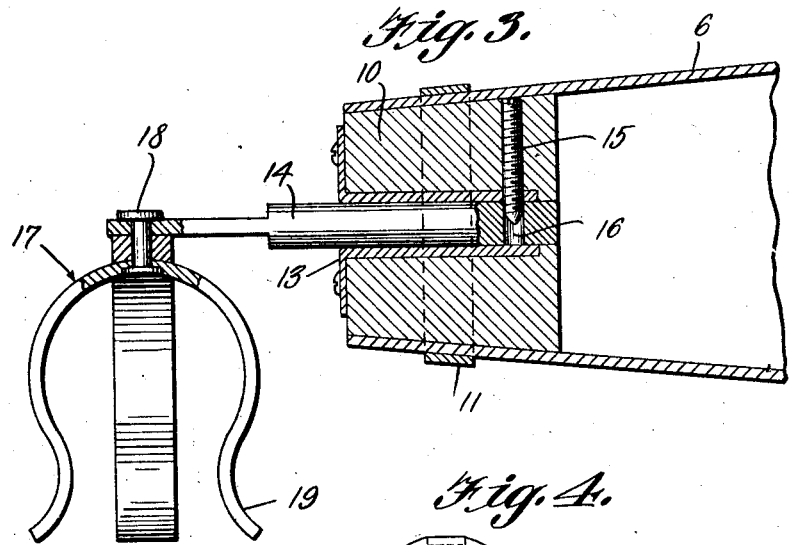
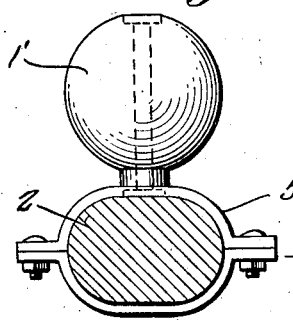
Alvin Colanduoni, INVENTOR
BY Victor J. Evans ATTORNEY
WITNESS:

Patented Apr. 30, 1929.

1,711,447

UNITED STATES PATENT OFFICE.

ALVIN COLANDUONI, OF SOMERVILLE, NEW JERSEY.

VEHICLE CONTROL FOR CRIPPLES.

Application filed February 3, 1926. Serial No. 85,775.

This invention relates to means for enabling a person with a crippled arm or arms to drive a motor vehicle, the general object of the invention being to provide a spherical member on the rim of the steering wheel and to provide means for attaching a socket member to the crippled arm of the driver so that he can place the socket member either in engagement with the vertical member on the wheel or the spherical member on the end of the transmission shifting lever for shifting the gears and for steering the vehicle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing the invention in use for steering a vehicle.

Figure 2 is a sectional view through a portion of the steering wheel, with the spherical member thereon.

Figure 3 is a sectional view through a portion of the arm engaging member and the socket member.

Figure 4 is a view similar to Figure 2, but showing a modification.

As shown in these views, I attach a knob or spherical member 1 to the rim 2 of the steering wheel A of a vehicle, either by having the stem 3 of the knob passed through a hole in the rim and held therein by the nut 4 engaging the threaded end of the stem or by providing a clamp 5 on the knob 1', to engage the rim, as shown in Figure 4. A boot or member 6 is adapted to be placed on the crippled arm of the operator, this boot being formed of two sections of leather which are fastened around the arm by the strap 7, a strap 8 being connected with the inner end of the member by the strips 9. This strap 8 is adapted to be placed above the elbow, so that it will prevent the boot from dropping off the arm. A block 10 of wood or the like is placed in the outer end of the boot and a strap 11 fastens the parts together. A metal sleeve 12 is placed in a hole in the central part of the block and is held therein by its flange 13 being fastened to the outer face of the block. A rod 14 is removably held in the sleeve by means of a screw 15 passing through a hole in the block and engaging a hole 16 in the rod. The outer end of this rod is reduced and a socket member 17 is fastened to its extremity by a rivet 18. This socket member is formed of a pair of crossed members providing four prongs which are shaped to fit around the knob 1 when the socket member is pressed upon the knob. The prongs have their ends curved outwardly, as shown at 19, so that they will spring outwardly when they are forced over the knob and then the prongs will spring back to their normal position to grip the knob.

It will thus be seen that when the crippled arm of the operator has the boot fastened thereto, it is simply necessary for the operator to place the socket member over the knob to enable him to steer the vehicle by moving the wheel by the movement of his arm. If both arms are crippled by the loss of the hands, two of these knobs could be used so that either arm could be connected with the wheel and I prefer to place a ball on the gear shift lever which is of the same size as the knob, so that this lever can be shifted by placing the socket member in engagement with the ball thereof. With this invention, a person who has lost either hand or both hands can operate a motor vehicle.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a vehicle driving device for a cripple, a sectional arm boot tapered toward one end, a block arranged in the small end of said boot for fitting engagement therewith, a strap surrounding said boot for securing said block therein, a sleeve secured in said block, a rod mounted in said sleeve and having a reduced outer end, means threaded in said block and extending into said sleeve and rod respectively for holding these parts associated, and a socket member pivotally secured to the reduced end and including crossed members providing cooperating prongs curved outwardly from their connection with each other, thence inwardly and terminating in outwardly curved ends.

In testimony whereof I affix my signature.

ALVIN COLANDUONI.